United States Patent [19]
Surot

[11] Patent Number: 5,810,435
[45] Date of Patent: Sep. 22, 1998

[54] CHILD SEAT INTENDED TO BE FASTENED TO A VEHICLE SEAT BY MEANS OF A SAFETY BELT

[75] Inventor: Patrick Surot, Cholet, France

[73] Assignee: Ampafrance S.A., Cholet, France

[21] Appl. No.: 883,765

[22] Filed: Jun. 27, 1997

[30] Foreign Application Priority Data

Jun. 28, 1996 [FR] France ................................. 96 08134

[51] Int. Cl.⁶ ....................................................... A47C 1/08
[52] U.S. Cl. .................. 297/250.1; 297/476; 297/216.11
[58] Field of Search ................. 297/250.1, 476, 297/254, 464, 216.11

[56] References Cited

U.S. PATENT DOCUMENTS

| 4,685,740 | 8/1987 | Föhl ........................................ 297/468 |
| 5,567,007 | 10/1996 | Czernakowski et al. ............ 297/250.1 |

FOREIGN PATENT DOCUMENTS

| A1-0 323 334 | 7/1989 | European Pat. Off. . |
| A2-0 328 311 | 8/1989 | European Pat. Off. . |
| A1-0608 860 | 8/1994 | European Pat. Off. . |
| 2 602 409 | 2/1988 | France . |
| A1-3505009 | 8/1986 | Germany . |
| C1-41 08 660 | 9/1992 | Germany . |
| 2260074 | 4/1993 | United Kingdom ................ 297/250.1 |

Primary Examiner—Laurie K. Cranmer
Attorney, Agent, or Firm—Pennie & Edmonds LLP

[57] ABSTRACT

Child seat intended to be fastened to a vehicle seat by means of a safety belt

Child seat comprising a sitting part 5 and a back part 6 and intended to be placed on and fastened to an automobile seat 4 equipped with a three-point rewinding safety belt 26 comprising a lap portion 26b and a chest portion 26a, the back part comprising, on its rear face, a means 25a for guiding the chest portion 26a of the safety belt, characterized in that said seat comprises a rotary element 33 equipped with an open loop 32 allowing the passage of the chest portion 26a of the safety belt and a means 35 for driving the rotary element 33 in rotation in a single direction, so as to tension the safety belt counter to the inertia system of the rewinder 28.

7 Claims, 4 Drawing Sheets

CHILD SEAT INTENDED TO BE FASTENED TO A VEHICLE SEAT BY MEANS OF A SAFETY BELT

Child seat to be fastened to a vehicle seat by means of a safety belt

The subject of the present invention is a child seat comprising a sitting part and a back part and intended to be placed on and fastened to an automobile seat equipped with a three-point rewinding safety belt comprising a lap portion and a chest portion.

It is known that child seats intended for automobiles are designed to ensure maximum protection in the event of an accident, this being achieved under the best possible conditions of comfort. An important problem in this type of child seat is fastening and locking the child seat relative to the vehicle seat.

This fastening may be carried out by means independent of the vehicle. However, it is generally preferred to use the safety belt with which the automobile seat is equipped. Safety belts of current vehicles are known as the three-point type, inasmuch as they define a lap strand or portion which retains the passenger in the region of the hips and a chest strand or portion which extends across the upper part of the passenger's body, passing over one of his shoulders. To fasten a child seat to the vehicle seat by means of such a three-point safety belt, the lap portion is generally passed across the lower part of the child seat, for example over a base or a rigid reinforcing element, by means of which the child seat is placed on the vehicle seat. The chest portion of the safety belt then advantageously passes behind the back part of the child seat in a guide means provided on the rear face of the back of the child seat.

German Patent No. 41 08 660 (CONCORD) and European Patent Application No. 328,311 (BSRD) show such a fastening of the child seat.

It may be expedient, moreover, to lock the chest strap by clamping at the location where it passes through the guide means provided on the rear face of the back of the child seat. Such clamping is described, for example, in French Patent Application No. 2,602,409 (AMPAFRANCE), where the chest portion of the vehicle safety belt is clamped between two crossmembers of the reinforcement of the child seat.

German Patent Application No. 35 05 009 (SCHRÄDER) describes, in turn, a device for clamping the chest portion of the safety belt by means of a cam which locks said chest portion in position when it passes through a slot. The abovementioned European Patent Application No. 328,311 likewise provides a device for clamping and tensioning the chest portion of the vehicle safety belt by means of a rotary cam, the assembly as a whole making it possible to lock and fasten the child seat by means of a three-point safety belt equipped with an inertia rewinding system. In this case, it is known that the safety belt is locked only in the event of an impact or an abrupt pull, so that it is expedient to provide additional locking means on the child seat. However, it is not possible with the means described in this document, which comprise a cam-like member exerting a simple clamping effect, to fasten the child seat easily and appropriately, at the same time locking it in position by means of the chest portion of the safety belt. Moreover, it is not possible for the vehicle safety belt to be tensioned effectively.

The subject of the invention is a child seat which can be effectively locked in position on the automobile seat by means of the safety belt, with which said seat is equipped, in the event that this safety belt has an inertia rewinding device.

Another subject of the invention is such a child seat, in which the fastening and locking in position relative to the chest portion of the safety belt take place simply and quickly.

Yet another subject of the invention is such a child seat, by means of which a reduction in the force exerted in order to tension the vehicle belt can be obtained easily.

The child seat according to the present invention comprises a sitting part and a back part and is intended to be placed on and fastened to an automobile seat equipped with a three-point rewinding safety belt comprising a lap portion and a chest portion. The back part comprises, on its rear face, a means for guiding the chest portion of the safety belt. The seat comprises a rotary element equipped with an open loop allowing the passage of the chest portion of the safety belt and a means for driving the rotary element in rotation in a single direction, so as to tension the safety belt counter to the rewinder.

It is thus possible to proceed in a simple way with the effective locking of the chest portion of the safety belt by rotating the latter at the location where it passes through the abovementioned open loop. This rotation may be carried out over a plurality of turns, until the inertia device of the rewinder has been neutralized, thus ensuring effective and constant locking of the chest portion of the safety belt of the automobile and a high tension of the safety belt due to the reduction in the force exerted, said reduction making it possible to lay the child seat more firmly against the vehicle seat.

According to a preferred embodiment of the invention, the means for driving in rotation in a single direction comprise a pawl/ratchet-wheel device which can easily be operated by the user after the child seat has been placed in a suitable position on the vehicle seat.

The rotary element, with which the seat is equipped, comprises preferably a transverse bar mounted, for the purpose of its rotation, behind the back part of the child seat.

The child seat according to the invention comprises, furthermore, means for the passage of the lap portion of the safety belt, so as to retain the child seat on the vehicle seat.

In an advantageous embodiment of the invention, the child seat comprises a bucket, defining the sitting part and the back part, and a rigid reinforcement, for example composed of metal tubes supporting the bucket, the reinforcement being intended to be placed on and fastened to the automobile seat. The transverse bar carrying the rotary element for tensioning the chest portion of the vehicle belt is fixed to the reinforcement. The lap portion of the safety belt passes over a U-shaped part of the reinforcement, said part being placed directly on the vehicle seat.

The invention will be understood better from the study of a particular embodiment described by way of non-limiting example and illustrated by the accompanying figures in which.

Figure 1:
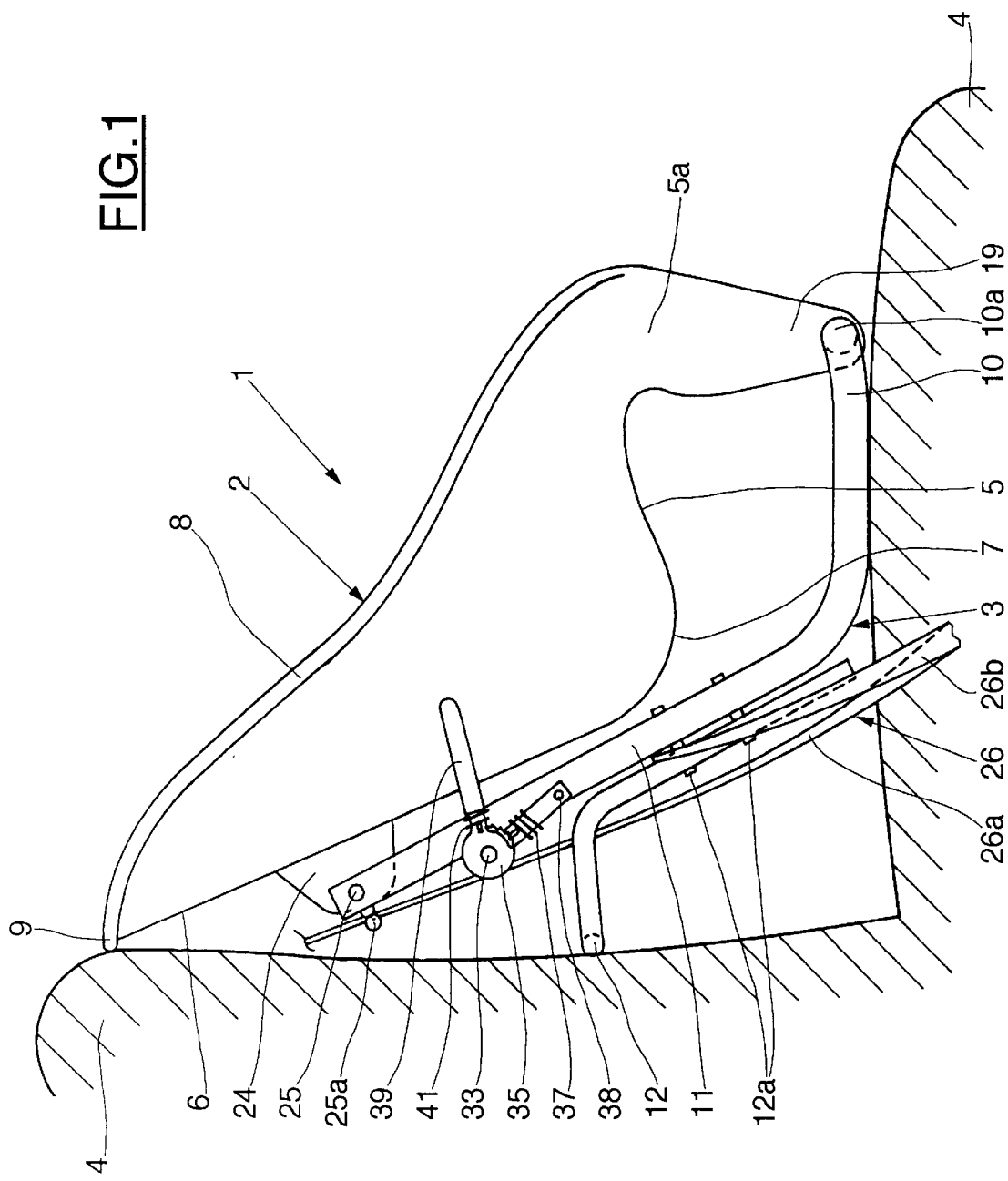
FIG. 1 is a side elevation view of a child seat according to the present invention.

As illustrated in the figures, the child seat, designated as a whole by 1, comprises a part molded from plastic, forming a bucket 2, and a tubular metal reinforcement 3 supporting the bucket 2 and constituting a support intended to be placed on and fastened to the vehicle seat 4, illustrated diagrammatically.

The bucket 2 comprises a substantially horizontal sitting part 5 and a back part 6 which is substantially vertical, but with a slight rearward inclination in order to improve the child's comfort. The sitting part 5 and the back part 6 are joined to one another by means of a curved lower portion 7. The bucket 2 is completed by lateral portions 8 which extend from the upper part 9 of the bucket 2, said upper part performing the function of a headrest, as far as its lower part, where it meets the front part 5a of the sitting part, said front part performing the function of a support for the child's legs or feet. As may be seen in the figures, the assembly thus formed has the general shape of a bucket, thus ensuring the child's comfort. The bucket made of molded plastic is, of course, lined with suitable upholstery which is not illustrated in the figures.

The tubular reinforcement 3 comprises a lower framework 10 arranged under the sitting part 5 and intended to be placed on the automobile seat 4. The lower framework 10 is extended upward in the form of a rear framework 11 which receives, furthermore, a transverse spacing bar 12 having a U-shaped design and fastened to the rear framework 11 by means of screws 12a, leaving a slight clearance. The entire tubular reinforcement 3 thus formed can be placed on the vehicle seat 4, the spacing bar 12 coming to bear on the back of the seat 4. The child seat 1 is then suitably installed on the vehicle seat 4, the bucket 2 being supported by the rigid reinforcement 3.

The bucket 2 made of molded plastic is fixed to the reinforcement 3 both in its lower part and in its upper part. For this purpose, the front part 5a has two protuberances 19 directed downward and gripping the crossmember 10a of the lower framework 10. In the same way, the back part 6 of the bucket 2 has, in its upper portion and on each side, a rearwardly projecting lug, designated by 24, which is molded integrally with the bucket 2 and which grips a crossmember 25 of the reinforcement 3.

The child seat 1 is secured to the vehicle seat 4 by means of the safety belt 26 which equips the automobile. Conventionally, such a safety belt 26, known as the three-point type, is fastened at its two ends to the body 27 of the automobile, one end comprising an inertia rewinding device 28 and the other an anchoring piece 29. The rewinding device 28 is of the conventional type and will not be described in detail in this text. Such a rewinding device comprises spring means acting on a drum which exerts a pull on the safety belt 26, tending to wind the latter onto said drum inside the rewinder. The advantage of a device is to enable the passenger of the automobile to have freedom of movement, for example allowing him to lean forward despite the safety belt 26. However, to ensure that the safety belt performs its function in the event of an accident, that is to say in the event of an abrupt impact, the rewinding device 28 comprises an inertia locking means which locks the displacement of the safety belt 26 within the rewinding device 28 in the event of an impact or an abrupt pull on the safety belt 26. Such a device gives full satisfaction when the safety belt is used by an adult passenger. However, when the safety belt 26 is used to fasten a child seat, such as the seat 1, to the vehicle seat 4, it will be appreciated that it is important to neutralize the functioning of the inertia device of the rewinder 28, so that, in the event of an accident, the child seat 1 remains perfectly fixed to the seat 4 of the automobile.

When it emerges from the rewinder 28, the safety belt 26 passes over a loop 30 which is fixed to the body 27 of the automobile and through which it passes freely and which performs the function of a deflection pulley. That part of the safety belt 26 which is located after the loop 30 is generally called the chest portion 26a of the safety belt 26, since it is intended to be placed normally between the hip and the opposite shoulder of the passenger. A buckle 31 can be displaced freely on the safety belt 26 and constitutes the separation between the chest portion 26a and the lap portion 26b, the end of which is secured to the anchoring piece 29. The buckle 31 cooperates in a known way with a locking member 31a fastened to the vehicle body 27, for example by means of an extension rod 33.

Figure 2:
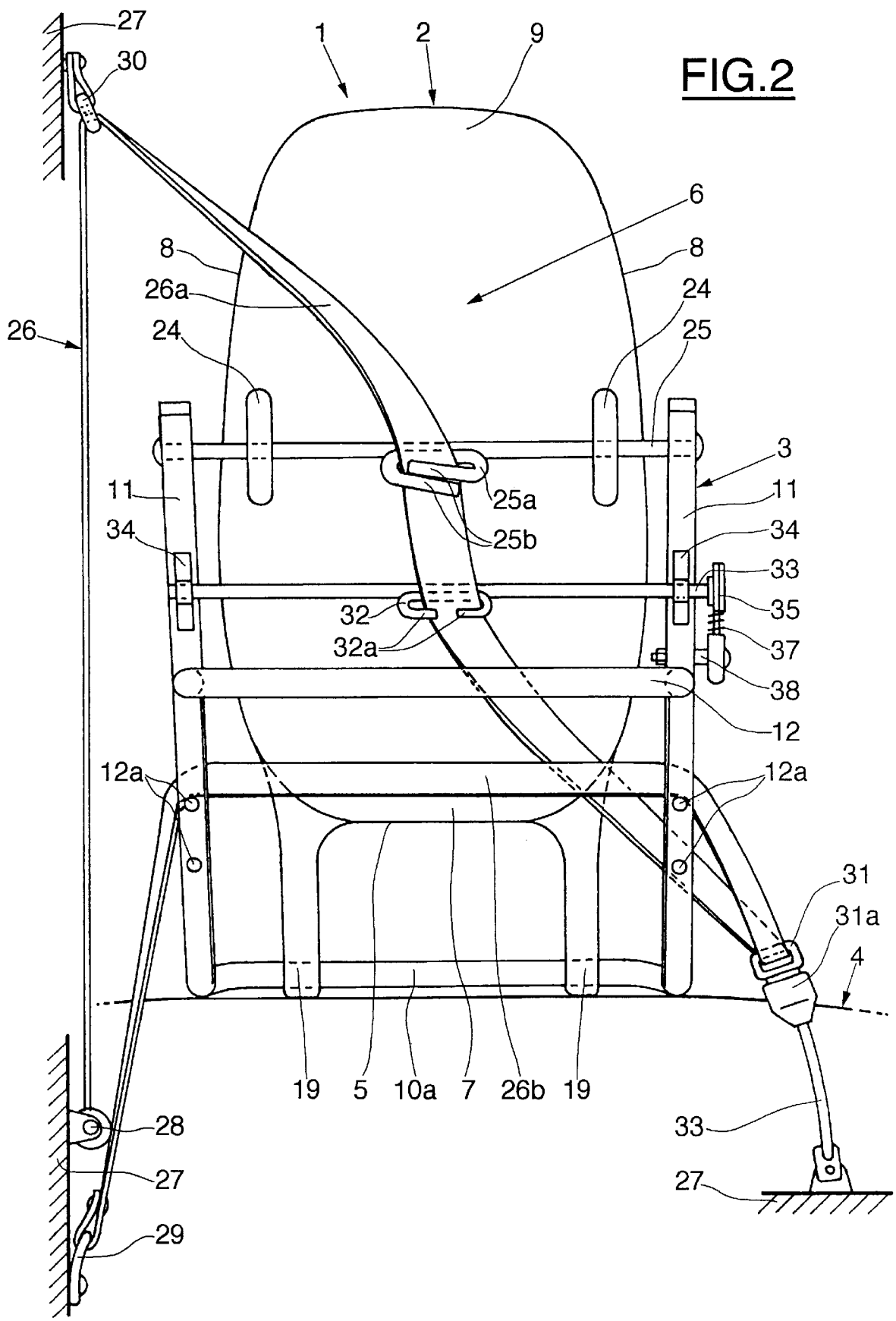
FIG. 2 is a rear view of the seat of FIG. 1, showing the passage of the chest portion of the safety belt before tensioning.

As may be seen in FIGS. 1 and 2, the child seat 1 is fastened to the automobile seat 4 both by means of the lap portion 26b of the safety belt 26 and by means of the chest portion 26a. The lap portion 26b may be passed easily between the U-shaped spacing bar 12 and the rear framework 11, at the same time remaining locked in the region of the fastening screws 12a of these two elements. The chest portion 26a may be passed behind the back 6 of the seat 1. For this purpose, as may be seen in FIG. 2, the chest portion 26a is first introduced into an open loop 25a fixed to the crossmember 25 of the reinforcement 3. In the example illustrated, said loop is a metal loop welded to the metal crossmember 25 and having branches 25b which partially overlap and which leave a slot between them, making it possible to introduce the chest portion 26a into the loop 25a.

The chest portion 26a is subsequently introduced into a second open loop 32 fixed to a transverse rotary rod 33. The open loop 32 has the shape of a C, the back of which is welded to the rotary rod 33 and which has two projecting branches 32a leaving between them a space which makes it possible for the chest portion 26a to be introduced easily into the loop 32.

Figure 3:
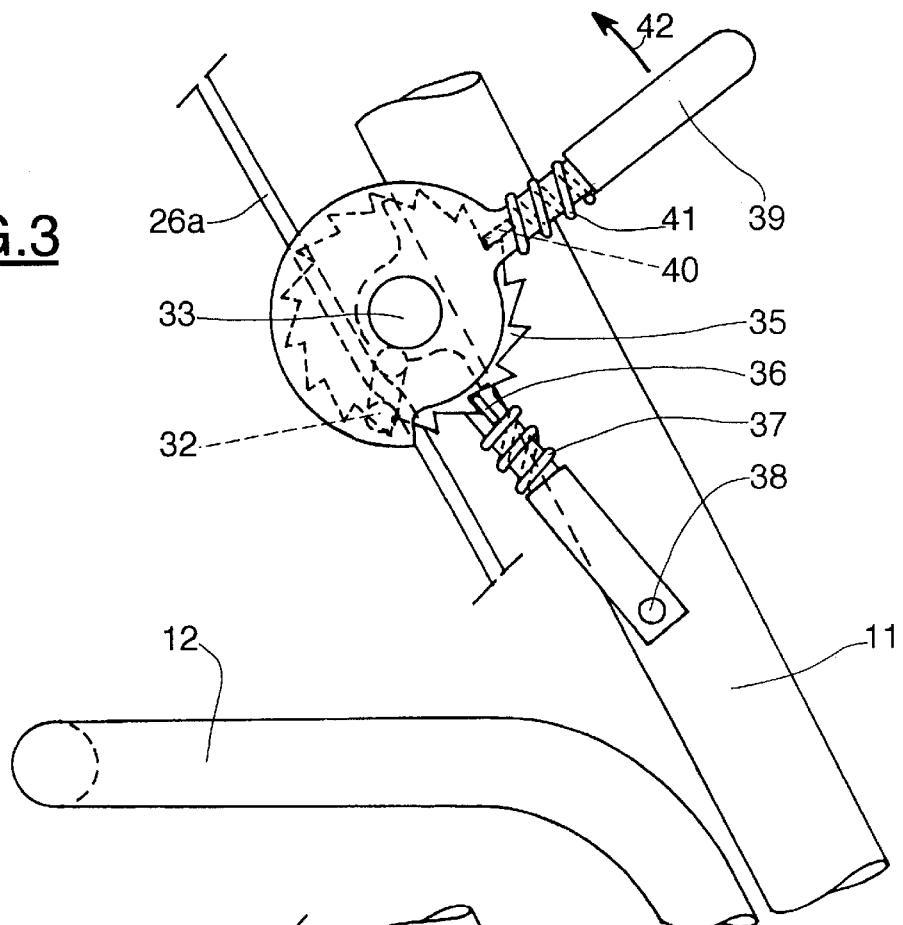
FIG. 3 is a detailed view of the pull-type device for driving in rotation, before tensioning.
Figure 4:
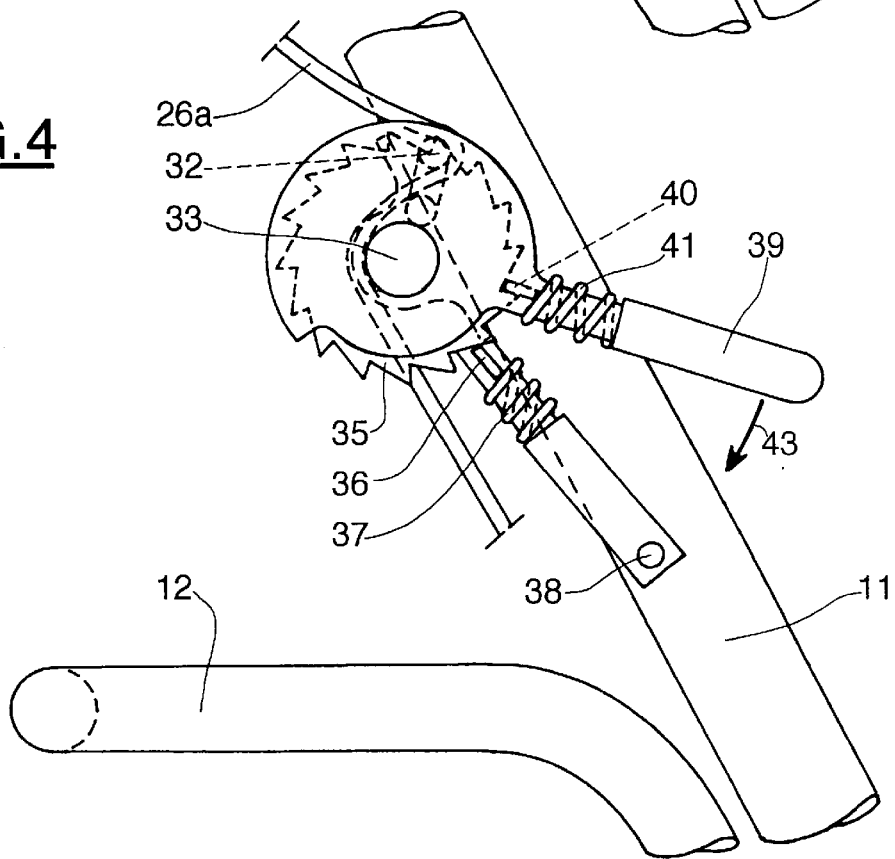
FIG. 4 is a view similar to that of FIG. 3, showing the commencement of tensioning.
Figure 5:
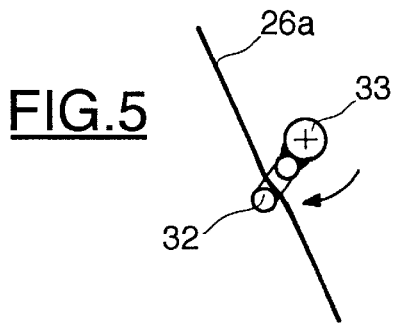
FIGS. 5 to 10 illustrate diagrammatically the passage of the chest portion of the safety belt through the loop of the drive means in various successive positions of rotation.
Figure 6:
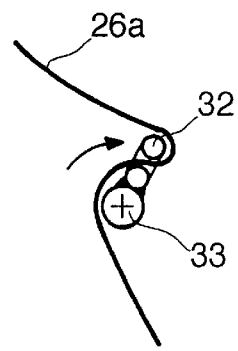
Figure 7:
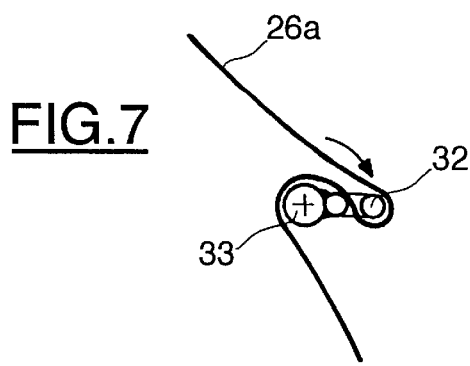
Figure 8:
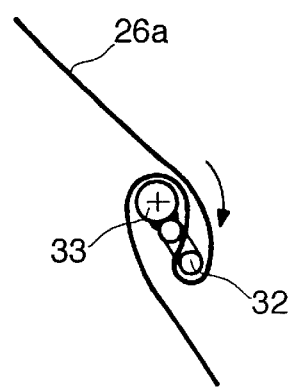
Figure 9:
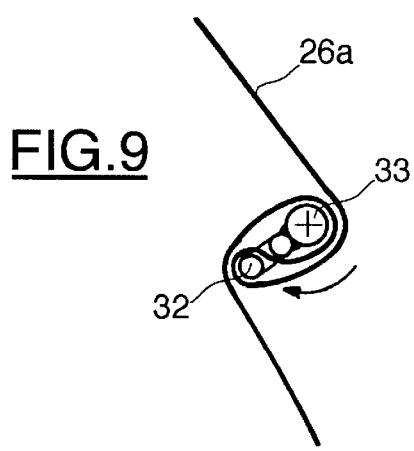
Figure 10:
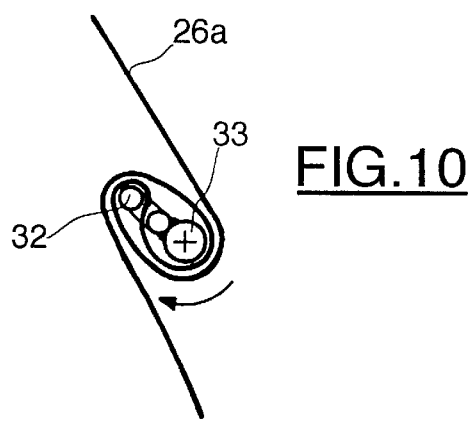

The rotary rod 33 is mounted on two bearings 34, each fixed to one of the members of the rear framework 11. On one of the sides of the seat 1, the rotary rod 33 projects outside the bearing 34 and has, at its end, a ratchet wheel 35 which may also be seen in FIGS. 3 and 4. A first locking-pawl device 36, pushed counter to the teeth of the ratchet wheel 35 by a compression spring 37, is fixedly mounted on an axle 38 fixed to the rear framework 11. As may be seen in FIGS. 3 and 4, the pawl 36 cooperates with the teeth of the ratchet wheel 35, so as to allow the latter to rotate only in the clockwise direction with respect to FIGS. 3 and 4.

Moreover, a manual operating lever 39 is mounted so as to rotate coaxially relative to the rotary rod 33 and has a second pawl 40 held counter to the teeth of the ratchet wheel 35 by a compression spring 41.

The device as a whole functions as follows. After the child seat 1 has been arranged on the vehicle seat 4, as illustrated in FIGS. 1 and 2, the vehicle safety belt 26 is put in place, as illustrated in FIG. 2. As mentioned above, the lap portion 26b is inserted between the transverse spacing bar 12 and the rear framework 11, whilst the chest portion 26a is passed successively through the open loops 25a and 32. For this purpose, the rotary rod 33 has first been placed in the position illustrated in FIG. 3, in which it is easy to pass the chest portion 26a of the belt 26 through the open loop 32. The buckle 31 is introduced into the locking member 31a.

The position of the child seat 1 on the vehicle seat 4 may also be adjusted easily due to the presence of the rewinding device 28 which allows a pull to be exerted on the safety belt 26. In order to fasten the child seat 1 effectively in position on the vehicle seat 4, it is sufficient, by means of a sudden movement, to pull on the chest portion 26a of the safety belt 26, preferably between the loop 30 fixed to the vehicle body and the passage loop 25a. In fact, as a result of the action of the inertia device located in the rewinding device 28, such an abrupt pulling movement causes the locking of the safety belt 26. With the pull on the chest portion 26a being maintained, the actual locking of the child seat 1 is then carried out by causing the operating lever 39 to execute a succession of reciprocating movements. By virtue of the presence of the two pawls 36 and 40, a first counterclockwise movement in the direction of the arrow 42 according to FIG. 3 does not, in fact, bring about any rotation of the rod 33. On the contrary, a movement in the direction of the arrow 43 indicated in FIG. 4, that is to say in the clockwise direction, causes the rod 33 to rotate about its axis and also thereby brings about the rotation of the C-shaped open loop 32. The pawl 36 opposes any return of the rotary rod 33 in the other direction, that is to say in the counter-clockwise direction.

After a certain number of reciprocating movements, for example the successive positions illustrated in FIGS. 5 to 10 are obtained, these showing that the loop 32, in combination with the rotary rod 33, drives the chest portion 26a in rotation on itself about the assembly formed by the loop 32 and the rod 33. During this rotation, the branches 32a of the loop 32 cause a loop to be formed on the chest portion 26, said loop being wound on itself, as seen in the diagrammatic FIGS. 5 to 10. This winding brings about a reduction in length of the chest portion 26a and thereby takes up the play which was produced during the sudden pull on the safety belt 26, said pull being intended to neutralize the inertia system of the rewinding device 28. This winding action and the presence of the lever 39 associated with the pawl 36 make it possible to obtain a reduction in the pulling force exerted on the safety belt 26, said reduction ensuring that the latter is highly tensioned.

It thereby becomes possible to exert high tension on the chest portion 26a as a result of the rotation of the lever 39, until the child seat is effectively laid firmly against the vehicle seat 4 by means of the safety belt 26 which can then be released and which thus remains under tension, the inertia system being neutralized.

In order subsequently to free the child seat, it is sufficient to slide the wound part of the chest portion 26a between the ends of the branches 32a of the open loop 32, after unlocking the buckle 31.

The present invention thus makes it possible to obtain an extremely effective fastening of the child seat by means which are simple to produce and easy to operate. By virtue of the rotation of the rod 33, which may be executed over a plurality of turns without any difficulty, it becomes possible to take up even considerable play of the safety belt 26 and thereby effectively neutralize the inertia system of the rewinding device, whilst exerting high tension on the safety belt.

I claim:

1. A child seat comprising a sitting part and a back part with a front and rear face, adapted to be placed on a vehicle seat of an automobile and fastened to said vehicle seat by way of a three-point rewinding safety belt with which said vehicle seat is equipped said three-point rewinding safety belt comprising a lap portion and a chest portion and being attached to the automobile through a rewinder means, wherein the rear face of the back part of the child seat has means for guiding said chest portion of the three-point rewinding safety belt and the child seat further comprises:

a rotary element with a retaining means allowing passage of the chest portion of said three-point rewinding safety belt and a means for rotating said rotary element in a single direction so as to tension the safety belt counter to said rewinder means.

2. The child seat according to claim 1, wherein the rotary element comprises a transverse bar mounted, for the purpose of its rotation, behind the back part.

3. The child seat according to claim 1, characterized in that the means for driving in rotation comprise a reciprocating operating lever equipped with a pawl cooperating with a ratchet wheel.

4. The child seat according to claim 1, wherein means are provided for the passage of the lap portion of the safety belt, so as to participate in retaining the child seat on the vehicle seat.

5. A child seat according to claim 1, wherein the child seat comprises a bucket, defining the sitting part and the back part, and a reinforcement (3), supporting the bucket and wherein the child seat is placed on and fastened to the vehicle seat.

6. A child seat according to claim 5, wherein the rotary element comprises a transverse bar is mounted on bearings fixed to a rear framework of the reinforcement.

7. A child seat according to claim 6, wherein a U-shaped transverse spacing bar coming to bear on a back of the vehicle seat is fastened to a rear part of the reinforcement, so as to make it possible for the lap portion of the belt to pass between said rear part of the reinforcement and the U-shaped transverse spacing bar.

\* \* \* \* \*